(12) United States Patent
Wang et al.

(10) Patent No.: US 9,263,030 B2
(45) Date of Patent: Feb. 16, 2016

(54) ADAPTIVE ONLINE FEATURE NORMALIZATION FOR SPEECH RECOGNITION

(71) Applicant: Microsoft Technology Licensing, LLC, Redmond, WA (US)

(72) Inventors: Shizhen Wang, Redmond, WA (US); Yifan Gong, Sammamish, WA (US); Fileno Alleva, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 13/748,411

(22) Filed: Jan. 23, 2013

(65) Prior Publication Data

US 2014/0207448 A1 Jul. 24, 2014

(51) Int. Cl.
| | | |
|---|---|---|
| G10L 15/00 | (2013.01) | |
| G10L 15/02 | (2006.01) | |
| G10L 15/07 | (2013.01) | |
| G10L 25/75 | (2013.01) | |

(52) U.S. Cl.
CPC .............. *G10L 15/02* (2013.01); *G10L 15/07* (2013.01); *G10L 25/75* (2013.01)

(58) Field of Classification Search
CPC ....... G10L 25/00; G10L 15/065; G10L 15/07; G10L 25/75
See application file for complete search history.

(56) References Cited

U.S. PATENT DOCUMENTS

| | | | | |
|---|---|---|---|---|
| 5,930,753 | A * | 7/1999 | Potamianos et al. ....... | 704/256.2 |
| 6,236,963 | B1 * | 5/2001 | Naito et al. .................. | 704/241 |
| 7,567,903 | B1 | 7/2009 | Goffin et al. | |
| 8,600,744 | B2 * | 12/2013 | Gilbert ......................... | 704/234 |
| 2005/0038655 | A1 * | 2/2005 | Mutel et al. .................. | 704/256 |
| 2007/0185715 | A1 * | 8/2007 | Wei et al. ...................... | 704/254 |
| 2008/0059156 | A1 * | 3/2008 | Han et al. ...................... | 704/207 |
| 2010/0204985 | A1 * | 8/2010 | Emori ........................... | 704/210 |
| 2011/0066426 | A1 * | 3/2011 | Lee ................................ | 704/207 |
| 2012/0101817 | A1 * | 4/2012 | Mocenigo et al. ............ | 704/231 |
| 2012/0253811 | A1 | 10/2012 | Breslin et al. | |
| 2012/0259632 | A1 | 10/2012 | Willett | |

OTHER PUBLICATIONS

Faria, Arlo, and David Gelbart. "Efficient Pitch-Based Estimation of VTLN Warp Factors." Ninth European Conference on Speech Communication and Technology. 2005.*

Wang, Zhuo, Peng Ding, and Bo Xu. "Some issues on the study of vocal tract normalization." International Symposium on Chinese Spoken Language Processing. 2002.*

(Continued)

*Primary Examiner* — Brian Albertalli
(74) *Attorney, Agent, or Firm* — Danielle Johnston Holmes; Steven Spellman; Micky Minhas

(57) ABSTRACT

A speech recognition system adaptively estimates a warping factor used to reduce speaker variability. The warping factor is estimated using a small window (e.g. 100 ms) of speech. The warping factor is adaptively adjusted as more speech is obtained until the warping factor converges or a pre-defined maximum number of adaptation is reached. The speaker may be placed into a group selected from two or more groups based on characteristics that are associated with the speaker's window of speech. Different step sizes may be used within the different groups when estimating the warping factor. VTLN is applied to the speech input using the estimated warping factor. A linear transformation, including a bias term, may also be computed to assist in normalizing the speech along with the application of the VTLN.

20 Claims, 8 Drawing Sheets

(56) References Cited

OTHER PUBLICATIONS

Ljolje, Andrej, Vincent Goffin, and Murat Saraclar. "Low latency real-time vocal Tract Length Normalization." Text, Speech and Dialogue. Springer Berlin Heidelberg, 2004.*

Lee, Li, and Richard C. Rose. "Speaker normalization using efficient frequency warping procedures." Acoustics, Speech, and Signal Processing, 1996. ICASSP-96. Conference Proceedings., 1996 IEEE International Conference on. vol. 1. IEEE, 1996.*

Wegmann, Steven, et al. "Speaker normalization on conversational telephone speech." Acoustics, Speech, and Signal Processing, 1996. ICASSP-96. Conference Proceedings., 1996 IEEE International Conference on. vol. 1. IEEE, 1996.*

Rodriguez, et al., "On Line Vocal Tract Length Estimation for Speaker Normalization in Speech Recognition", In Proceedings of VI Jornadas en Tecnología del Habla and II Iberian SLTech Workshop, Nov. 10, 2010, 4 pages.

Emori, et al., "Rapid Vocal Tract Length Normalization using Maximum Likelihood Estimation", In Proceedings of 7th European Conference on Speech Communication and Technology, Sep. 3, 2001, 4 pages.

Lee, Gil Ho, "Real-Time Speaker Adaptation for Speech Recognition on Mobile Devices", In Proceedings of 7th IEEE Consumer Communications and Networking Conference, Jan. 9, 2010, 2 pages.

Lei, et al., "Robust Feature Space Adaptation for Telephony Speech Recognition", In Proceedings of 9th International Conference on Spoken Language Processing, Sep. 17, 2006, 4 pages.

Yapanel, et al., "Towards an Intelligent Acoustic Front End for Automatic Speech Recognition: Built-in Speaker Normalization", In EURASIP Journal on Audio, Speech, and Music Processing, Jun. 19, 2008, 13 pages.

* cited by examiner

MOBILE COMPUTING DEVICE

ADAPTIVE ONLINE FEATURE NORMALIZATION FOR SPEECH RECOGNITION

BACKGROUND

Speaker variability often affects the performance of a speech recognition system. For example, the performance of a speech recognition system developed using adult speech may degrade when testing on child speech. One major source of speaker variability is the vocal tract length of the speaker. The vocal tract length changes between different people (e.g. male, female, children) causing a change in the formant frequencies of the speech spectrum (e.g. higher for females and lower for males). Vocal Tract Length Normalization (VTLN) is a technique used to reduce the effects of speaker's vocal tract variability through frequency warping. Using VTLN algorithms in a real-world application (e.g., XBOX KINECT) with low or zero latency, however, can be challenging.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A speech recognition system adaptively estimates a warping factor used to reduce speaker variability. The warping factor is initially estimated using a small window (e.g. 100 ms) of speech, and then is adaptively adjusted as more speech is obtained until the warping factor converges or a pre-defined maximum number of adaption is reached. Estimating the warping factor using a smaller amount of data as compared to using one or more complete utterances of a user is directed at reducing a latency for the speech recognition system. The speaker may first be placed into a group selected from two or more groups based on characteristics that are associated with the speaker's window of speech. For example, a first group may relate to a speaker determined to be within a first range of the warping factor (e.g. between 0.8 to 0.86), a second group may relate to the speaker being within a second range (e.g. 0.87 to 1.0), and the like. Different step sizes may be used within the different groups when estimating the warping factor. For example, a lower resolution step size (e.g. bigger step) may be used for one group (e.g. children) and a higher resolution step size (e.g. smaller step) for a different group (e.g. adults). VTLN is applied to the speech input using the estimated warping factor. A linear transformation, including a bias term, may also be computed to assist in normalizing the speech along with the application of the VTLN.

DETAILED DESCRIPTION

Figure 1:
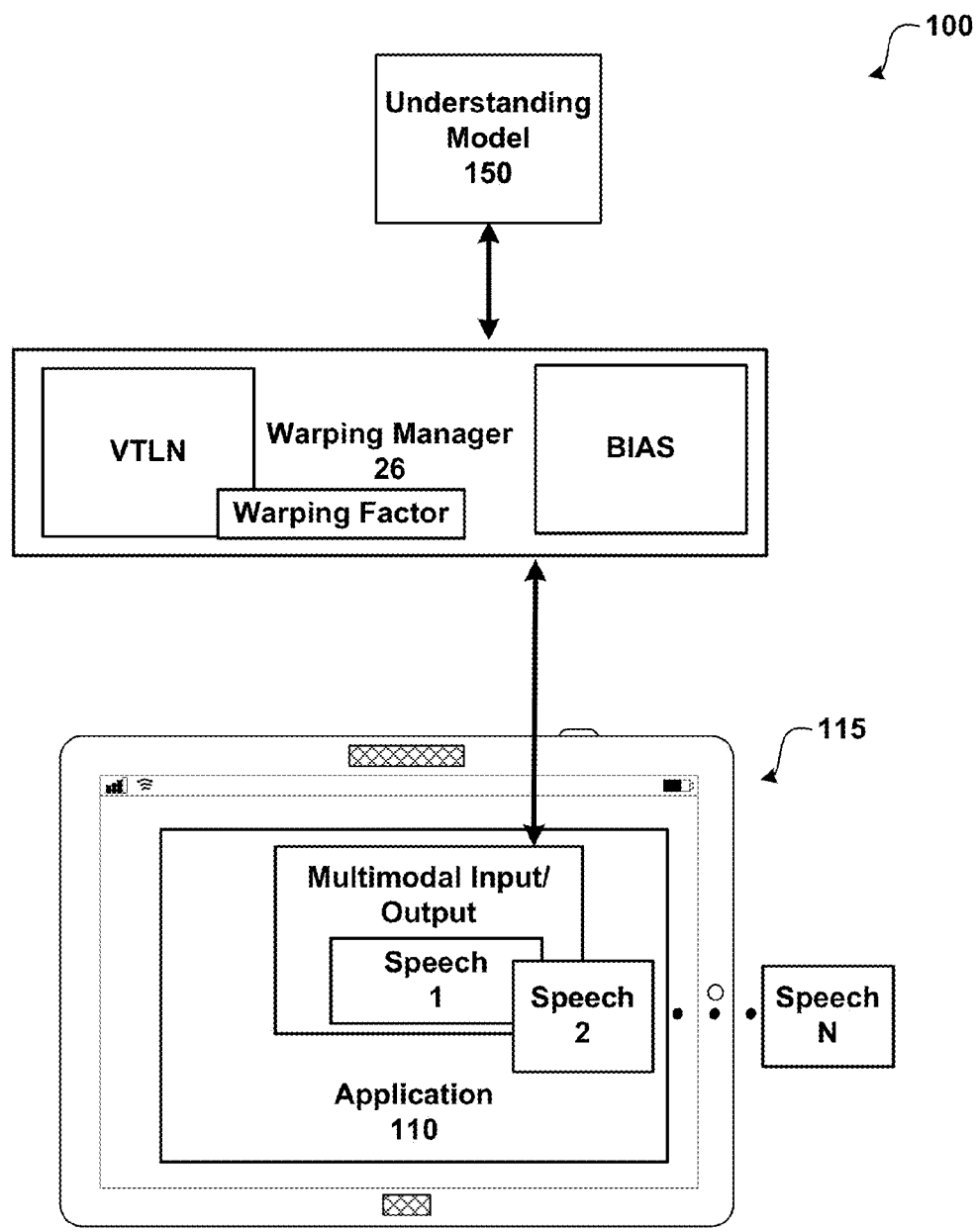
FIG. 1 shows a system for adaptively estimating a warping factor used to reduce speaker variability.

Referring now to the drawings, in which like numerals represent like elements, various embodiment will be described.

FIG. 1 shows a system for adaptively estimating a warping factor used to reduce speaker variability. As illustrated, system 100 includes warping manager 26, understanding model(s) 150, speech 1-N, application 110 and touch screen input device/display 115.

In order to facilitate communication with the warping manager 26, one or more callback routines, may be implemented. According to one embodiment, application program 110 is a multimodal application that is configured to receive speech input and/or input from a touch-sensitive input device 115 and/or other input devices. For example, voice input, keyboard input (e.g. a physical keyboard and/or SIP), video based input, and the like. Application program 110 may also provide multimodal output (e.g. speech, graphics, vibrations, sounds, . . . ). For example, a user may say a phrase (e.g. an utterance) to identify a task to perform by application 110 (e.g. selecting a movie, buying an item, identifying a product, . . . ). Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated comprises a touch screen input device/display 115 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Warping manager 26 may provide information to/from application 110 in response to user input (e.g. speech/gesture). Warping manager 26 may be configured in a network service (e.g. an online service), in a computing device (e.g. touch screen input device/display 115), or some combination of functionality distributed between a network service and the computing device. Warping manager 26 may use an understanding model (e.g. a Spoken Language Understanding (SLU) model and/or multimodal understanding model such as understanding model 150) that is used when interacting with the an application/service (e.g. an online service).

As discussed, speaker variability can adversely affect an operation of an application/service that utilizes speech input. One item of speaker variability is the vocal tract length of the speaker that varies across different speakers. For example, the vocal tract length may vary from about 13 cm in females to a vocal tract length of about 18 cm in males. The formant frequencies of the speech for a person are inversely proportional to the vocal tract length. With these vocal tract length variations, the frequencies of the different speakers can vary greatly. In an attempt to adjust for these differences, VTLN is used to reduce inter-speaker variability in the received speech by compensating for vocal tract length variation between different speakers. VTLN uses a warp factor that is used to rescale the frequency of the speech. According to an embodiment, the warping factor used ranges between about 0.8 and 1.2. Other ranges may be used (e.g. 0.5 to 2, 0.7 to 1.3, . . . ).

Warping manager 26 is configured to adaptively estimate a warping factor used to reduce speaker variability. Instead of using one or more complete utterances (e.g. one or more complete sentences) to estimate the warping factor, a small window (e.g. 100 ms) of speech (e.g. speech 1) is used by warping manager 26 to estimate a warping factor. As such, the latency associated with the speech recognition system is smaller as compared to traditional VTLN applications. The window size used to estimate the warping factor may be adjustable. For example, the window size may be somewhere between 50 ms and 250 ms. Generally, the larger the window size, the more latency that is introduced into the speech system.

Warping manager 26 initially receives a small amount of speech (e.g. speech 1 having a determined window size, such as 100 ms). Warping manager 26 may place the speaker into a group selected from two or more groups based on characteristics that are associated with the speaker's window of speech. For example, a first group may relate to a speaker determined to be within a first range of the warping factor (e.g. between 0.8 to 0.86), a second group may relate to the speaker being within a second range (e.g. 0.87 to 1.0), and the like. According to an embodiment, warping manager 26 places the speaker within a group based on the first window of speech received and returns an estimated factor based on the selected group. For example, the first window of speech may indicate that the speaker is a male that has a warping factor that should be set somewhere within a range of the group (e.g. 0.8 to 1.2). Initially, warping manager 26 may return an average value within the group and refine this estimate after receiving more speech data.

Different step sizes may be used within the different groups when estimating the warping factor. For example, a lower resolution step size (e.g. bigger step) may be used for one group (e.g. children) and a higher resolution step size (e.g. smaller step) for a different group (e.g. adults). When speech is received within a window, the range is used at each determined step to determine an estimate for the warping factor. Warping manager 26 continues to adaptively estimate the warping factor as more speech is received until the warping factor converges or a pre-defined maximum number of adaptation is reached. For example, the warping factor may converge after receiving one or more complete utterances that occur in four seconds of speech data.

Warping manager 26 uses the estimated warping parameter when applying VTLN. VTLN may be applied upon receipt of speech data and/or after a predetermined time. For example, VTLN may be applied after determining a group for the speaker.

Warping manager 26 may perform bias estimation in addition to the adaptive warping factor estimate and the application of VTLN is applied to the speech input using the estimated warping factor. A bias term may also be computed to assist in normalizing the speech along with the application of the VTLN. For example, a Feature space Maximum Likelihood Linear Regression (fMLLR) may be used in addition to the adaptive estimation of the warping factor and application of the VTLN. More details are provided below.

Figure 2:
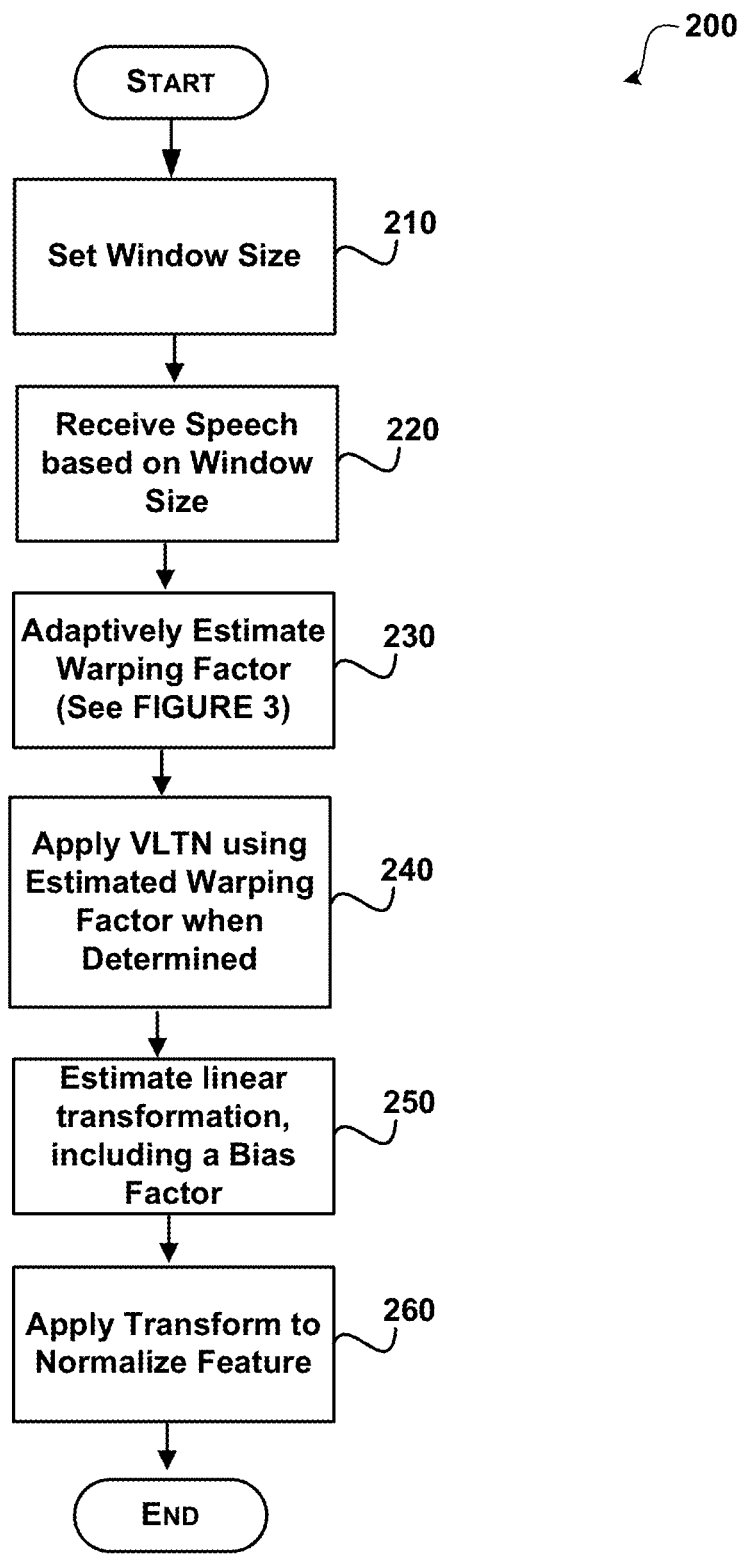
FIG. 2 shows a process for adaptively estimating a warping factor and estimating bias in a speech recognition system.
Figure 3:
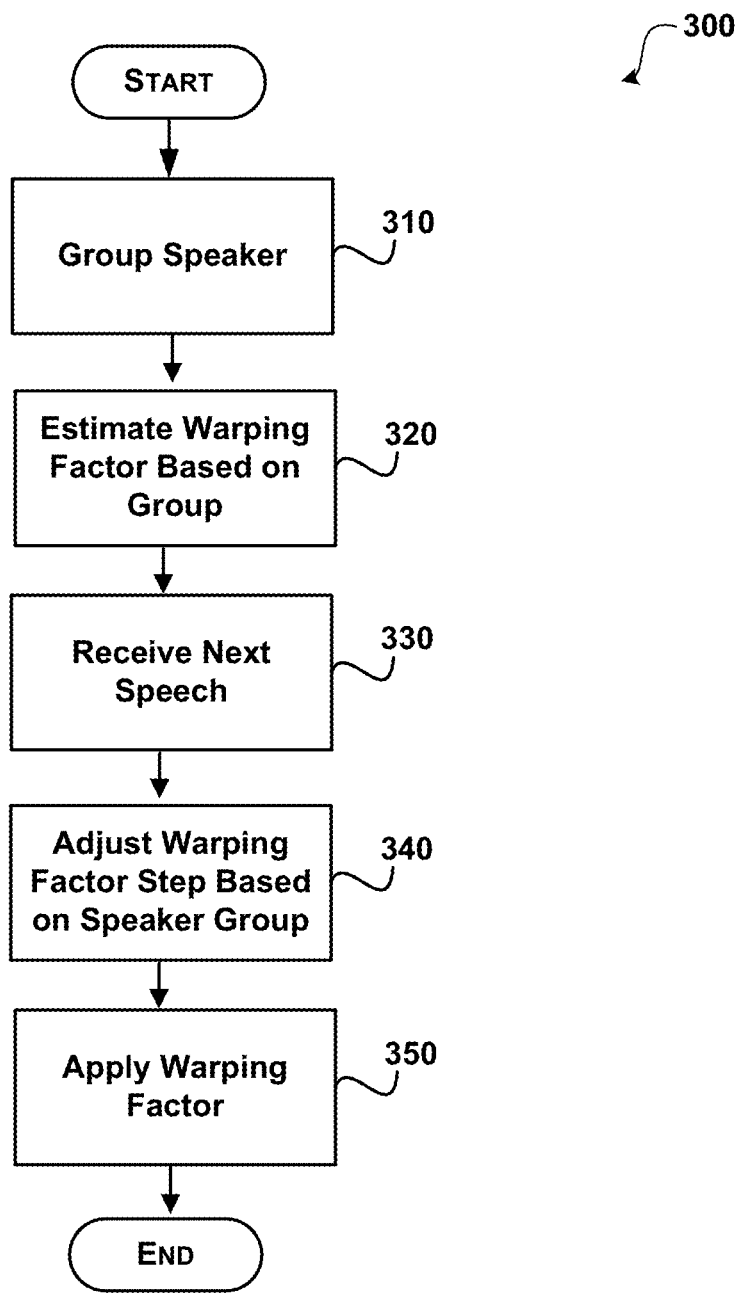
FIG. 3 shows a process for grouping a speaker and setting step sizes based on the grouping.

FIGS. 2 and 3 shows illustrative processes (200, 300) for adaptive warping factor estimation and bias filtering. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 2 shows a process 200 for adaptively estimating a warping factor and estimating bias in a speech system.

After a start operation, the process moves to operation 210, where a window size is set. The window size is set to include a small amount of speech. Generally, a window size is set such that a complete utterance is not contained within the window. According to an embodiment, a window size of 100 ms is set. Other window sizes may be set. For example, the window size may be 50 ms, 75 ms, 100 ms, 125 ms, 150 ms, 175 ms, 200 ms, 225 ms, 250 ms, 275 ms, 300 ms, 325 ms, 350 ms, and the like. Instead of using one or more complete utterances (e.g. one or more complete sentences) to estimate the warping factor, the small window of speech is used to estimate a warping factor used in the application of VTLN.

Flowing to operation 220, a small portion of speech is received. For example, a 100 ms of speech is received.

Moving to operation 230, the warping factor to associated with the speaker is estimated. Generally, the warping factor estimation is determined by stepping through a range of values (e.g. from 0.8 to 1.2) using a predetermined step size. The step size may be constant through the range of values and/or vary depending on a group associated with the speaker. For example, when it is determined that the speaker is an adult as compared to a child, a finer step value may be used when estimating the warping factor. When a previous warping factor has been estimated, a smoothing function may be applied such that the estimated warping factors does not vary dramatically before convergence (See FIG. 3 and related discussion for more information regarding estimating the warping factor).

Transitioning to operation 240, VTLN is applied to the speech to account for the estimated variability of the speaker. VTLN may be applied upon receipt of speech data and/or after a predetermined time (e.g. 200 ms, 500 ms, 1 s, . . . ).

Flowing to operation 250, a linear transformation, including a bias factor may be estimated to assist in removing acoustical noise not associated with the speech and/or channel mismatch. For example, to remove background noise, adjust for a microphone being used by the speaker, and the like.

Moving to operation 260, the bias factor may be used when applying a filter to the speech data.

The process then moves to an end operation and returns to processing other actions.

FIG. 3 shows a process 300 for grouping a speaker and setting step sizes based on the grouping.

After a start operation, the process moves to operation 310, where the speaker may be placed into a group selected from two or more groups based on characteristics that are associated with the speaker's window of speech. According to an embodiment, a range of possible values for the warping factor is used to form the groups (e.g. 0.5 to 2, 0.7 to 1.5, 0.8 to 1.2 and the like). Two or more groups may be formed (e.g. 2, 3, 4, 5, 6, . . . ). Each group is associated with a partial range of the determined possible ranges for the warping factor. Each partial range may be the same or different from other ranges used in the groups. For example, each group may be associated with a range of 0.15 (e.g. a group from 0.5-0.65, a group from 0.65 to 0.8, a group from 0.8 to 0.95, a group from 0.95 to 1.1, a group from 1.1 to 1.25, and the like). The groups may also be associated with different ranges. For example, a first group from 0.5-0.7, a second group from 0.7 to 0.8, a third group from 0.8 to 0.9, a fourth group from 0.9 to 1.0, a fifth group from 1.0-1.2, and the like. According to an embodiment, the speaker is placed into a group based on an initial portion of speech (e.g. contained within the determined window size). For example, a first group may relate to a speaker determined to be within a first range of the warping factor (e.g. between 0.8 to 0.86), a second group may relate to the speaker being within a second range (e.g. 0.87 to 1.0), and the like. Other methods may also be used to determine the grouping. For example, a placement within a group may be assisted by other input data (e.g. camera, video, textual input, user selection, and the like).

Flowing to operation 320, the warping factor may be estimated based on the grouping of the speaker. For example, the speaker may be placed into a group having range from 0.8 to 1.2. A warping factor estimate may be determined to be an average value within the group without further performing estimation. This initial estimate may be refined after receiving more speech data. According to another embodiment, the initial estimate of the warping factor may be determined by computing possible values of the warping factors based on the obtained speech.

Transitioning to operation 330, the next speech portion is received. Different step sizes may be used within the different groups when estimating the warping factor. For example, a lower resolution step size (e.g. bigger step) may be used for one group (e.g. children) and a higher resolution step size (e.g. smaller step) for a different group (e.g. adults). When speech is received within a window, the range is used at each determined step for the to determine an estimate for the warping factor.

Moving to operation 340, the warping factor is used when VTLN is applied.

The process then flows to an end operation and returns to processing other actions.

Figure 4:
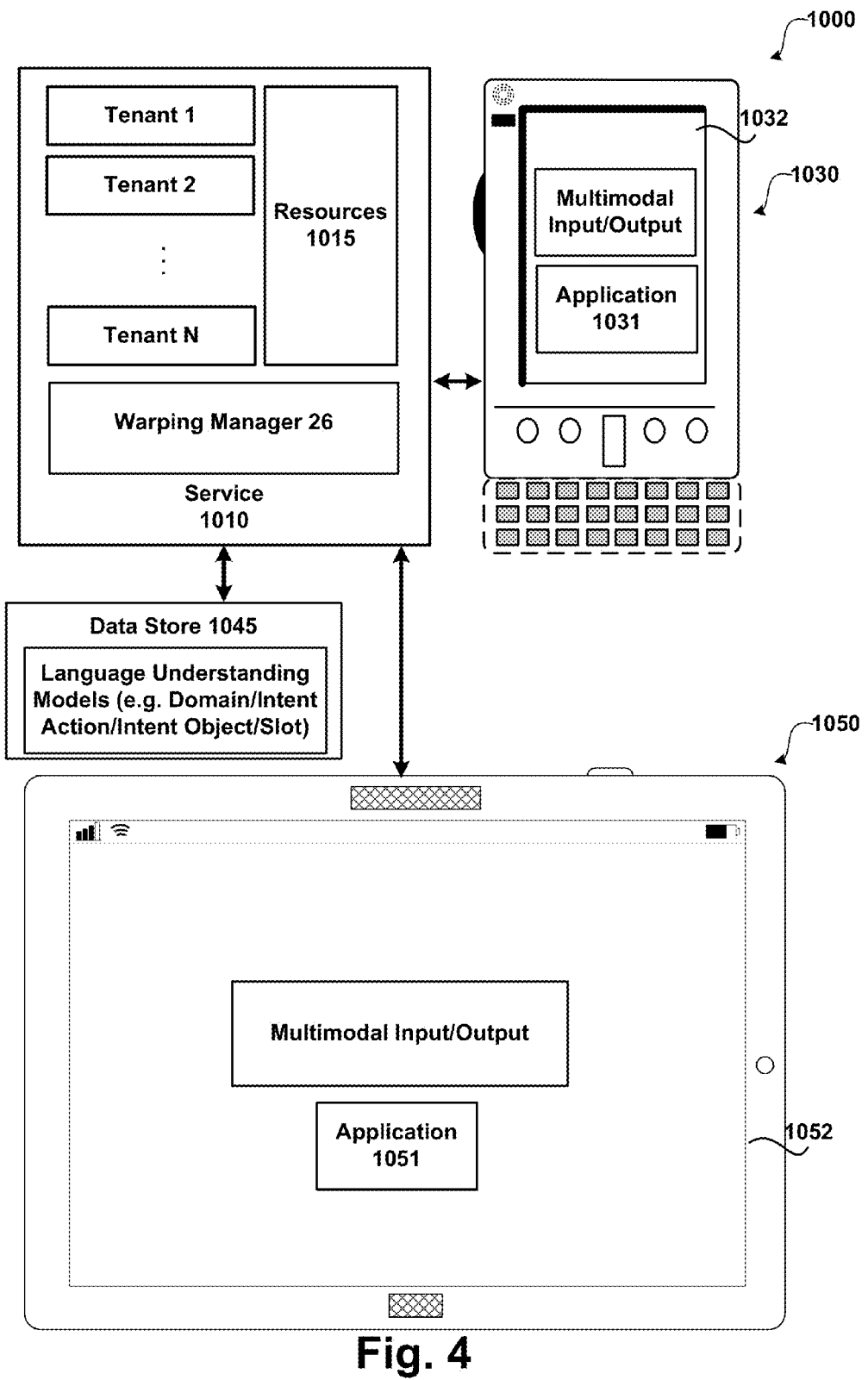
FIG. 4 illustrates an exemplary speech system using adaptive warping factor estimation.

FIG. 4 illustrates an exemplary speech system using adaptive warping factor estimation. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services that receive utterances to interact with the service, such as multimodal services related to various applications (e.g. games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant language understanding service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with multimodal applications (1031, 1051). As illustrated, touch screen input device/display 1050 and smart phone 1030 shows exemplary displays 1052/1032 showing the use of an application that utilize multimodal input/output (e.g. speech/graphical displays). Data may be stored on a device (e.g. smart phone 1030, slate 1050 and/or at some other location (e.g. network data store 1045). Data store 1054 may be used to store understanding model(s) used by the language understanding system. The applications used by the devices may be client based applications, server based applications, cloud based applications and/or some combination.

Warping manager 26 is configured to perform operations relating to adaptively estimating a warping factor and applying VTLN and FMLLR as described herein. While manager 26 is shown within service 1010, the all/part of the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
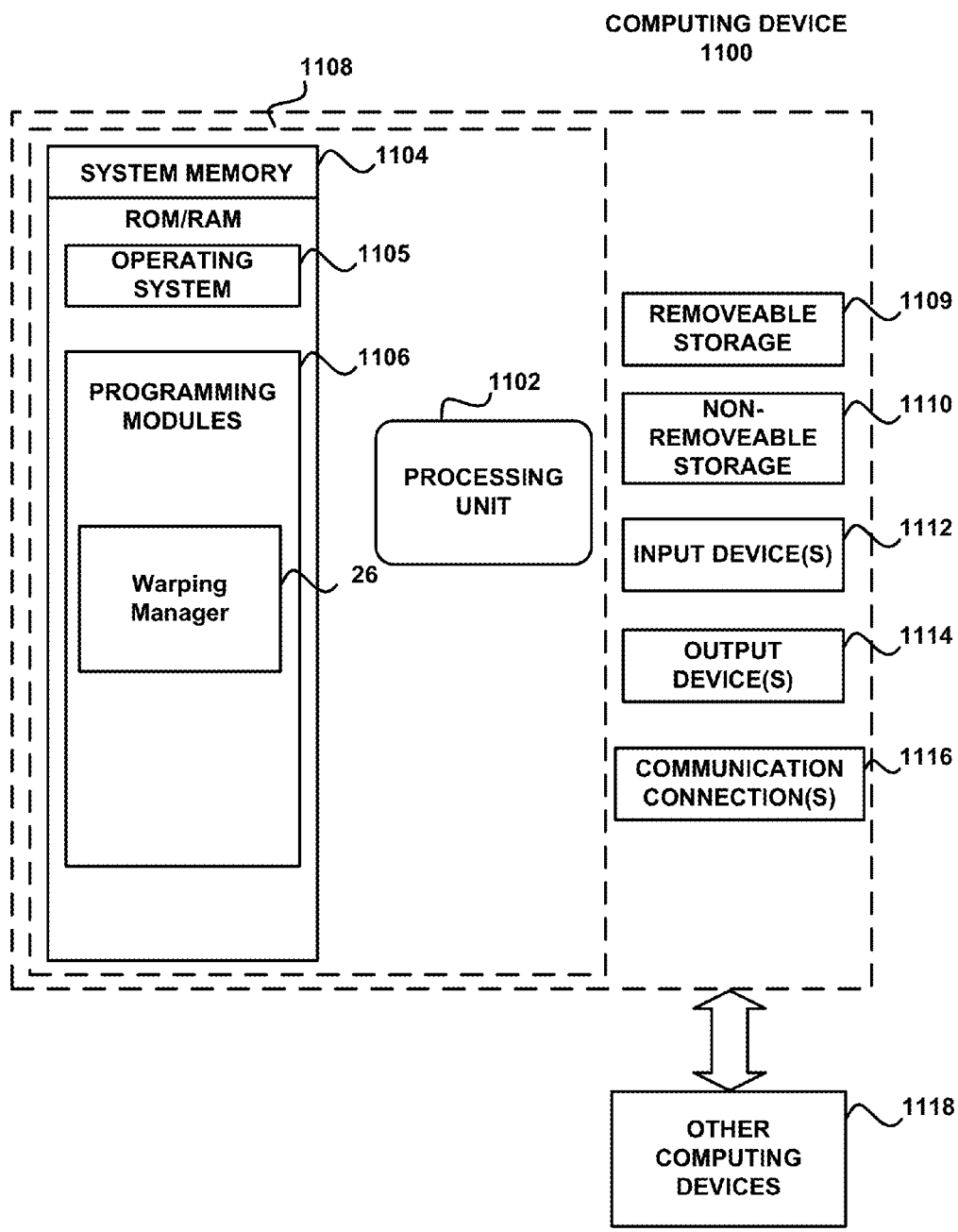
FIGS. 5-7 and the associated descriptions provide a discussion of a variety of operating environments in which embodiments of the invention may be practiced.
Figure 6A:
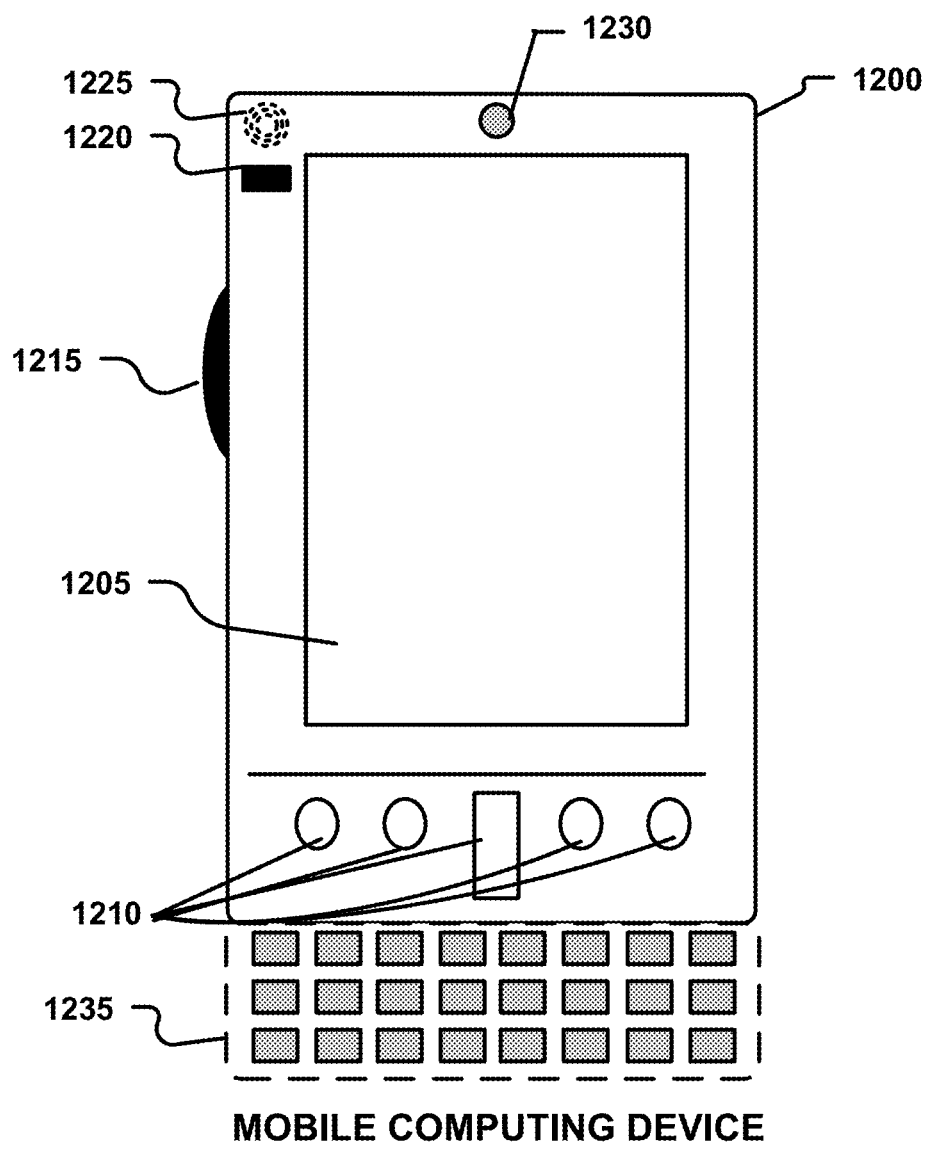
Figure 6B:
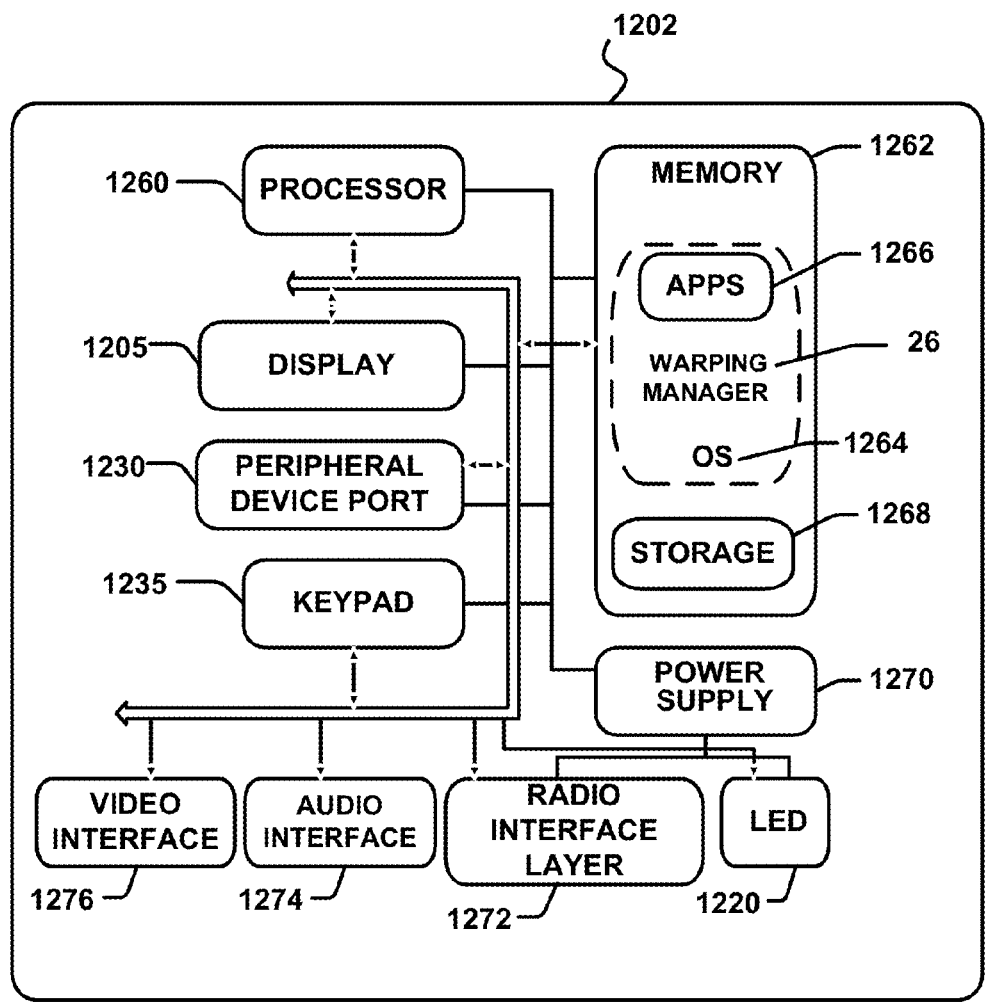
Figure 7:
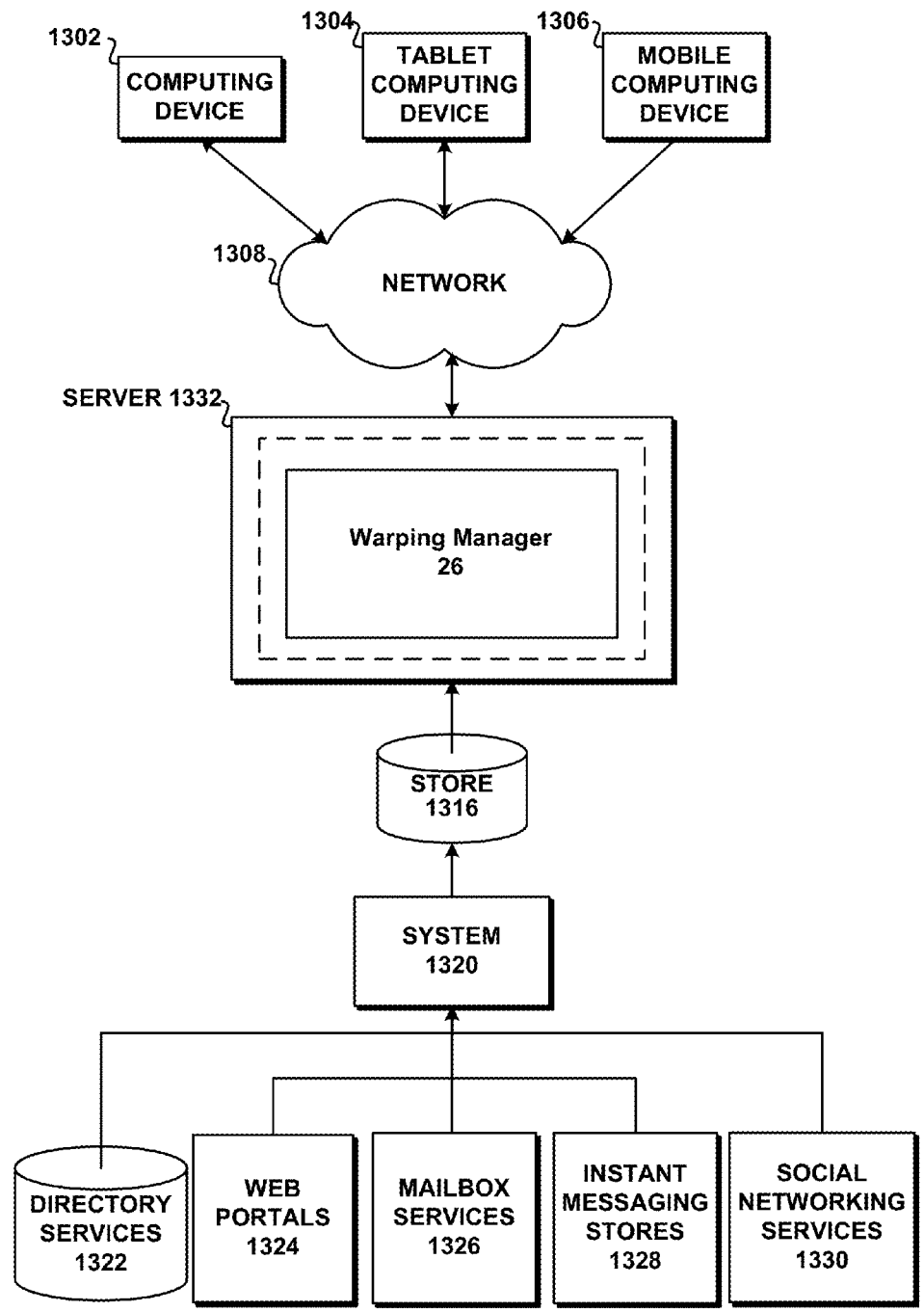

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a warping manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 5 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile telephone, a smartphone, a tablet personal computer, a laptop computer, and the like, with which embodiments of the invention may be practiced. With reference to FIG. 6A, an example mobile computing device 1200 for implementing the embodiments is illustrated. In a basic configuration, mobile computing device 1200 is a handheld computer having both input elements and output elements. Input elements may include touch screen display 1205 and input buttons 1215 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1215 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 6B is a block diagram illustrating components of a mobile computing device used in one embodiment, such as the computing device shown in FIG. 6A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the warping manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 8B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture for a system as described herein.

Components managed via the warping manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to performing actions as described herein. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method, performed by a processor, for reducing speaker variability in speech recognition, the computer-implemented method comprising:
   receiving a first portion of an utterance received from a speaker;
   based on the first potion of the utterance, placing the speaker into a group, wherein the group is one of a plurality of groups each defined by a range of warping factor values;
   based on the grouping of the speaker, estimating a warping factor;
   receiving additional portions of speech from the speaker;
   adaptively adjusting the estimated warping factor based on the additional portions of speech; and
   based on the adjusted estimated warping factor, adjust the speech recognition for speaker variability associated with the speaker.

2. The computer-implemented method of claim 1, wherein adaptively adjusting the warping factor comprises changing a step size to check possible values of the warping factor based on the group in which the speaker is placed based on speech characteristics of the speaker.

3. The computer-implemented method of claim 2, wherein the step size is smaller for a first group in a first range of possible warping factor values and larger for a second group in a second range of the possible warping factor values.

4. The computer-implemented method of claim 1, wherein using the warping factor to adjust the speech recognition for speaker variability that is associated with the speaker comprises applying Vocal Tract Length Normalization (VTLN) using the determined warping factor.

5. The computer-implemented method of claim 4, further comprising applying Feature space Maximum Likelihood Linear Regression (fMLLR) in addition to VTLN using the adjusted estimation of the warping factor.

6. The computer-implemented method of claim 1, further comprising adaptively adjusting the warping factor until at least one of: a value of the warping factor converges; and a pre-defined maximum number of adaption is reached.

7. The computer-implemented method of claim 1, wherein a window size between 50 ms and 150 ms determines an amount of speech in each portion of the speech received from the user.

8. The computer-implemented method of claim 1, wherein the first group corresponds to adult speakers and the second group corresponds to child speakers.

9. The computer-implemented method of claim 1, wherein the placing the speaker into the group is further based on video data.

10. A computer-readable storage device storing computer-executable instructions for reducing speaker variability in speech recognition, comprising:
    receiving a window of speech that is sized between 50 ms and 150 ms comprising a portion of an utterance received from a speaker;
    estimating a warping factor using the window of speech;
    receiving additional windows of speech;

using the additional portions when adaptively estimating the warping factor; and using the warping factor when applying Vocal Tract Length Normalization (VTLN) using the estimated warping factor to adjust for speaker variability that is associated with the speaker.

11. The computer-readable storage device of claim 10, further comprising placing the speaker into a group determined from different groups each defined by a range of warping factor values and setting an initial value of the warping factor based on the grouping of the speaker.

12. The computer-readable storage device of claim 10, wherein adaptively estimating the warping factor comprises changing a step size to check possible values of the warping factor based on a group in which the speaker is placed based on a speech characteristic of the speaker.

13. The computer-readable storage device of claim 12, wherein the step size is smaller for a group in a first range of possible warping factor values and larger for a group in a second range of the possible warping factor values.

14. The computer-readable storage device of claim 10, further comprising applying Feature space Maximum Likelihood Linear Regression (fMLLR) in addition to VTLN using the adaptive estimation of the warping factor.

15. The computer-readable storage device of claim 10, further comprising adaptively estimating the warping factor until at least one of: a value of the warping factor converges; and a pre-defined maximum number of adaption is reached.

16. A system for adapting for reducing speaker variability in speech recognition, comprising:
    a processor and memory;
        an operating environment executing using the processor; and
        a warping manager that is configured to perform actions comprising:
    receiving a window of speech that is sized between 50 ms and 150 ms comprising a portion of an utterance received from a speaker;
    estimating a warping factor using the window of speech;
    receiving additional windows of speech;
    using the additional portions when adaptively estimating the warping factor until a value of the warping factor converges; and
    using the warping factor when applying Vocal Tract Length Normalization (VTLN) using the estimated warping factor to adjust for speaker variability that is associated with the speaker.

17. The system of claim 16, further comprising placing the speaker into a group determined from different groups each defined by a range of warping factor values and setting an initial value of the warping factor based on the grouping of the speaker.

18. The system of claim 16, wherein adaptively estimating the warping factor comprises changing a step size to check possible values of the warping factor based on a group in which the speaker is placed based on a speech characteristic of the speaker.

19. The system of claim 18, wherein the step size is smaller for a group in a first range of possible warping factor values and larger for a group in a second range of the possible warping factor values.

20. The system of claim 17, further comprising applying Feature space Maximum Likelihood Linear Regression (fMLLR) in addition to VTLN using the adaptive estimation of the warping factor.

* * * * *